United States Patent
Kwon

(10) Patent No.: US 10,042,419 B2
(45) Date of Patent: Aug. 7, 2018

(54) METHOD AND APPARATUS FOR PROVIDING ADDITIONAL INFORMATION OF DIGITAL SIGNAGE CONTENT ON A MOBILE TERMINAL USING A SERVER

(71) Applicant: ELECTRONICS AND TELECOMMUNICATIONS RESEARCH INSTITUTE, Daejeon (KR)

(72) Inventor: Seung Joon Kwon, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 77 days.

(21) Appl. No.: 15/008,894

(22) Filed: Jan. 28, 2016

(65) Prior Publication Data
US 2016/0224300 A1    Aug. 4, 2016

(30) Foreign Application Priority Data

Jan. 29, 2015    (KR) .......................... 10-2015-0014535

(51) Int. Cl.
*G06F 3/01*    (2006.01)
*G06K 9/20*    (2006.01)
(Continued)

(52) U.S. Cl.
CPC ............... *G06F 3/011* (2013.01); *G06F 3/01* (2013.01); *G06K 9/2054* (2013.01); *G06F 3/005* (2013.01); *G06F 3/147* (2013.01); *G06F 3/1454* (2013.01); *G09G 2370/04* (2013.01); *G09G 2370/042* (2013.01); *G09G 2370/22* (2013.01)

(58) Field of Classification Search
CPC .. G06F 3/1454; G06F 17/30259; G06F 3/147; G06F 3/005; G06F 3/01; G06F 3/011; G06Q 30/0267; H04W 4/18; H04W 4/20; H04N 7/185; G09G 2370/042; G09G 2370/04; G09G 2370/22; G06K 9/2054
See application file for complete search history.

(56) References Cited

U.S. PATENT DOCUMENTS 8,326,038 B2 * 12/2012 Boncyk ............. G06F 17/30247
382/181
8,965,460 B1 * 2/2015 Rao ........................ G06F 3/005
455/566
(Continued)

FOREIGN PATENT DOCUMENTS

KR    10-2012-0004320 A    1/2012
KR    10-2012-0136060 A    12/2012

*Primary Examiner* — Darlene M Ritchie
(74) *Attorney, Agent, or Firm* — NSIP Law

(57) ABSTRACT

A method of providing additional information of content, a mobile terminal and a content control server are provided. A method of providing additional information of content, performed by a mobile terminal, may include acquiring a captured image of a digital signage terminal that is displaying content and transferring the captured image to a content control server, receiving additional information of the content for each of content areas of the mobile terminal, the content areas being mapped by an information providing server based on screen information of the digital signage terminal, and rendering the received additional information.

20 Claims, 12 Drawing Sheets

(51) Int. Cl.
*G06F 3/147* (2006.01)
*G06F 3/14* (2006.01)
*G06F 3/00* (2006.01)

(56) References Cited

U.S. PATENT DOCUMENTS

| | | | | |
|---|---|---|---|---|
| 9,013,505 B1* | 4/2015 | Thornton | ................ | G09G 5/36 345/419 |
| 2006/0038833 A1* | 2/2006 | Mallinson | ............... | A63F 13/02 345/633 |
| 2007/0022442 A1* | 1/2007 | Gil | .................... | G06F 17/30905 725/62 |
| 2007/0035562 A1* | 2/2007 | Azuma | ................. | G03B 13/28 345/633 |
| 2009/0132923 A1* | 5/2009 | Han | ...................... | H04L 12/282 715/717 |
| 2011/0170787 A1* | 7/2011 | Gum | .................... | H04W 76/10 382/209 |
| 2011/0199479 A1* | 8/2011 | Waldman | ........... | G01C 21/3602 348/116 |
| 2012/0120266 A1* | 5/2012 | Kang | ................. | H04N 5/23212 348/211.2 |
| 2012/0256954 A1* | 10/2012 | Soon-Shiong | ...... | G06F 17/3087 345/633 |
| 2013/0147686 A1* | 6/2013 | Clavin | ................... | G06F 3/013 345/8 |
| 2013/0182002 A1* | 7/2013 | Macciola | ............... | H04N 1/387 345/589 |
| 2013/0325617 A1* | 12/2013 | Delug | ................ | G06Q 30/0267 705/14.61 |
| 2014/0164131 A1 | 6/2014 | Kim et al. | | |
| 2014/0218361 A1* | 8/2014 | Abe | ...................... | G06T 19/006 345/424 |
| 2014/0308932 A1 | 10/2014 | Lee et al. | | |
| 2015/0145889 A1* | 5/2015 | Hanai | .................. | H04N 5/2621 345/633 |
| 2015/0201167 A1* | 7/2015 | Yamaji | ................ | G05B 19/042 348/86 |
| 2015/0278870 A1* | 10/2015 | Priebatsch | ......... | G06Q 30/0267 705/14.64 |
| 2015/0279037 A1* | 10/2015 | Griffin | .................. | G06F 3/1446 345/1.3 |
| 2016/0034039 A1* | 2/2016 | Maeda | .................... | G06F 3/011 715/810 |
| 2016/0041388 A1* | 2/2016 | Fujimaki | ............... | G02B 27/017 345/2.1 |
| 2016/0086585 A1* | 3/2016 | Sugimoto | .............. | G09G 5/391 345/668 |
| 2017/0223422 A1* | 8/2017 | Maruyama | ........... | H04N 21/482 |

* cited by examiner

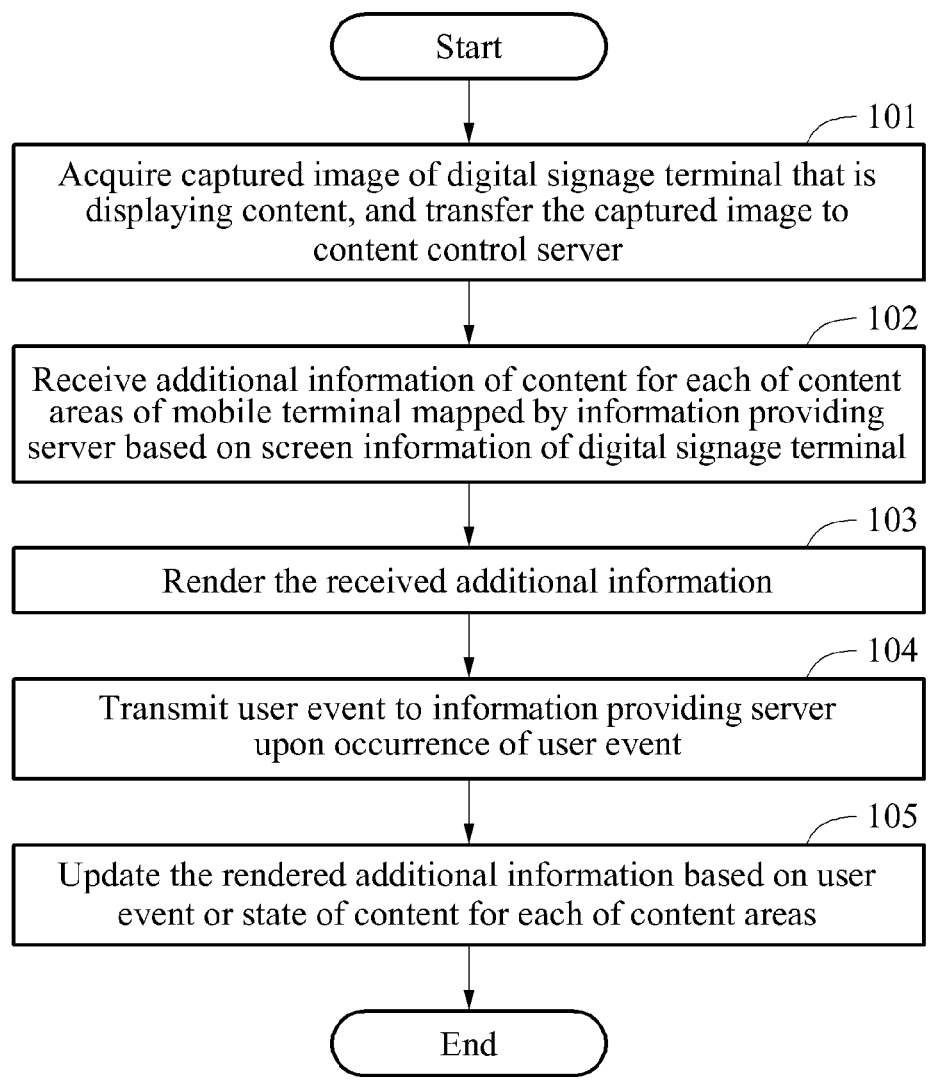

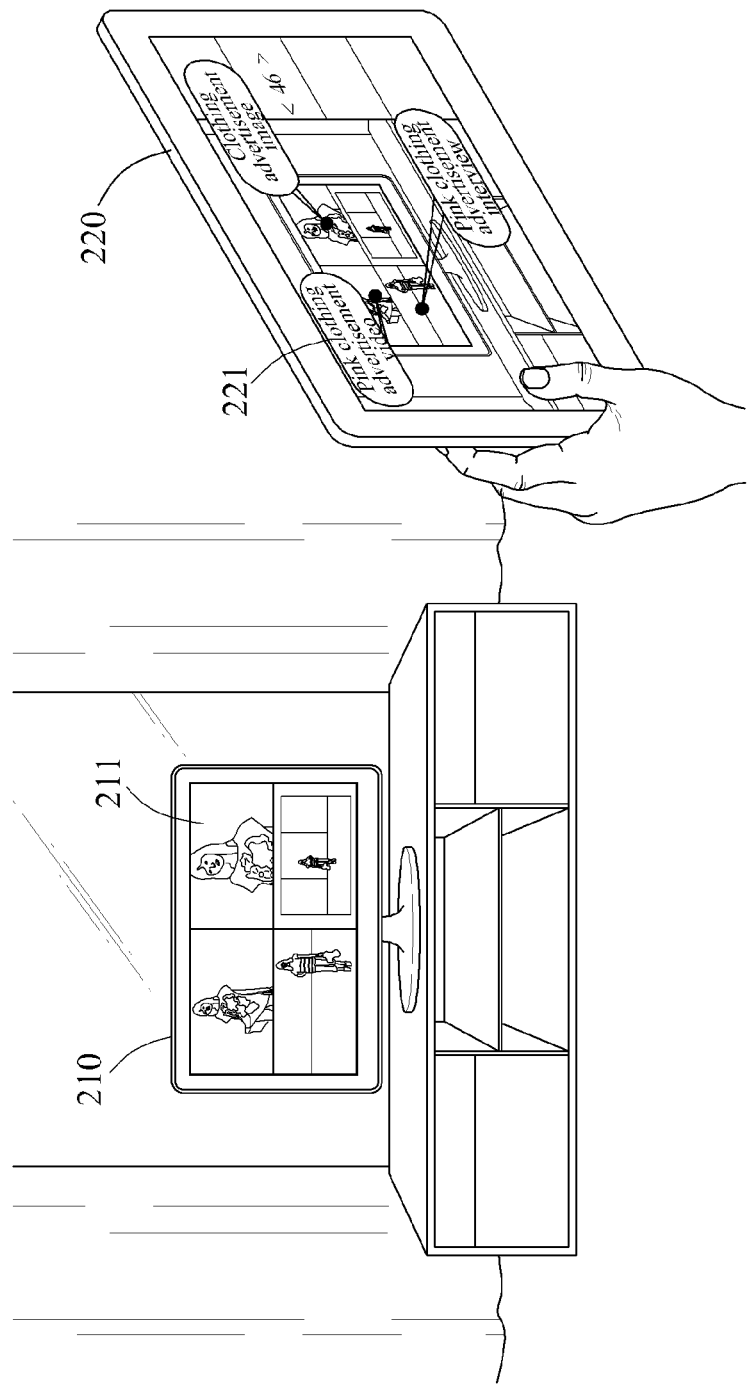

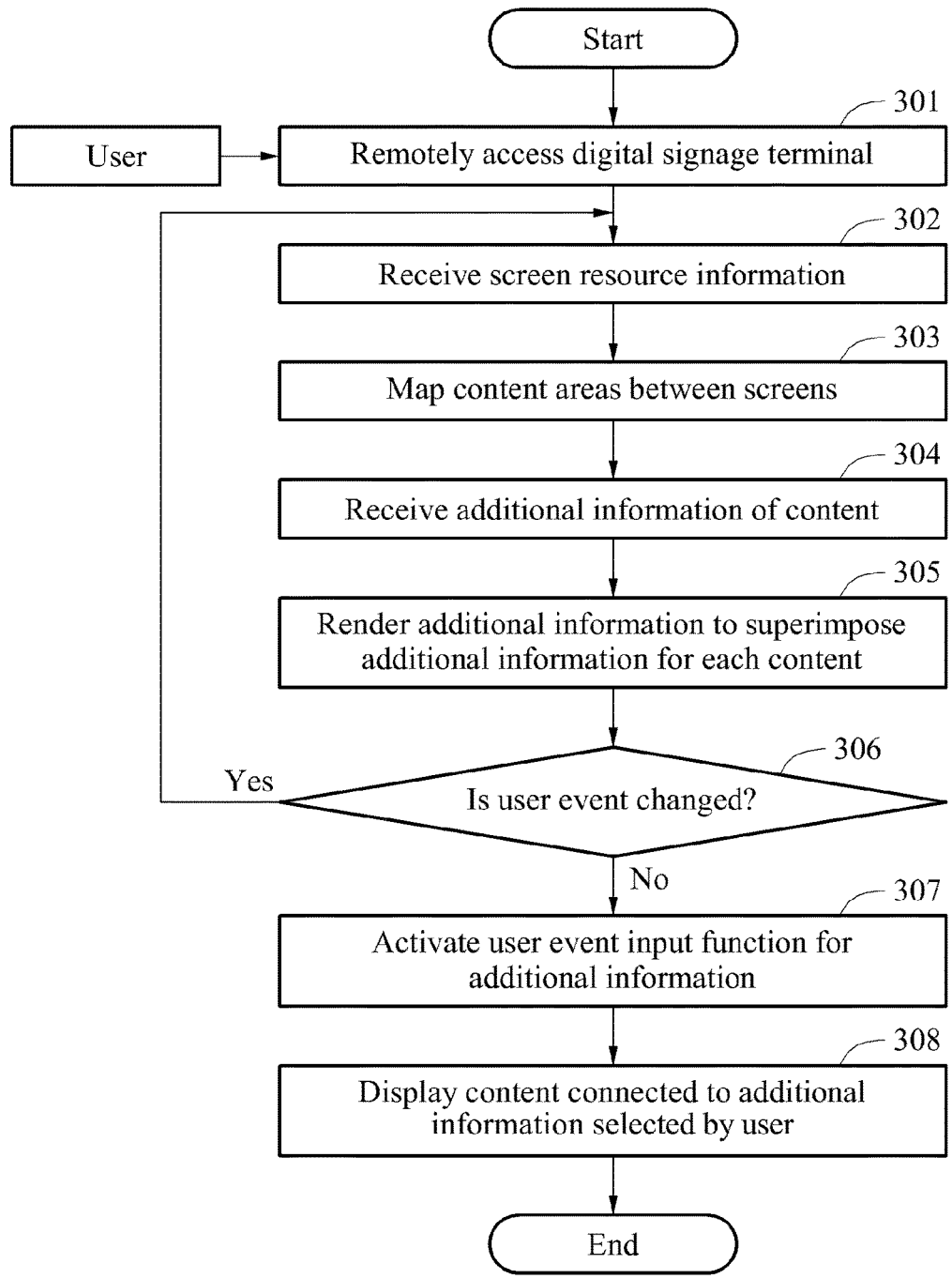

FIG. 3B

(1080x1920)(129.254.179.226) Kiosk 1: 091KC0FXEWMM2
(1920x 480)(129.254.179.227) Bar 1: 091KC0LDURDQG
(1920x1080)(129.254.179.228) Shelf 1-1: 091KC0LHE3WB2
(1920x1080)(129.254.179.229) Shelf 1-2: 091KC0LKA2F7U
(1920x1080)(129.254.179.214) BIG 1: 091KBYU143XGW

```
<layout>
  <root-layout background-color="<SolidColorBrush xmlns="http://schemas.microsof.com/winfx/2006/xaml/presentation">#FFFFFF</SolidColorBrush>" height="1080px" width="1920px" />
  <region xml:id="region_image1" height="1080px" left="0px" top="0px" width="1920px" />
  <region xml:id="region_image2" height="89px" left="19px" top="30px" width="240px" />
  <region xml:id="region_text1" height="98.57142857142857px" left="294px" top="22.428571428571px" width="960px" />
  <region xml:id="region_image3" height="671.8571428571431px" left="10.428571428571px" top="164.428571428571px" width="1205.285714285714px" />
  <region xml:id="region_image4" height="869.1428571428571px" left="1211.714285714286px" top="203.285714285714px" width="702.571428571428px" />
  <region xml:id="region_image5" height="234px" left="19px" top="839px" width="1189.285714285714px" />
  <region xml:id="region_media1" height="640px" left="30px" top="177px" width="1167px" />
  <region xml:id="region_image6" height="500px" left="1231px" top="220.571428571429px" width="340px" />
  <region xml:id="region_image7" height="100px" left="1579px" top="221px" width="315px" />
  <region xml:id="region_image8" height="100px" left="1579px" top="321px" width="315px" />
  <region xml:id="region_image9" height="105px" left="1579px" top="421px" width="315px" />
  <region xml:id="region_image10" height="100px" left="1579px" top="521px" width="315px" />
  <region xml:id="region_image11" height="100px" left="1579px" top="621px" width="315px" />
  <region xml:id="region_text2" height="60px" left="52px" top="855px" width="1064px" />
  <region xml:id="region_text3" height="60px" left="52px" top="925px" width="1064px" />
  <region xml:id="region_web1" height="150px" left="1580px" top="10px" width="400px" />
  <region xml:id="region_image12" height="308.5714285714286px" left="1231.428571428571px" top="739.8571428571431px" width="662.8571428571431px" />
  <region xml:id="region_image13" height="5.14px" left="25.285714285714px" top="830.9999999999999px" width="1175.714285714286px" />
  <region xml:id="region_image14" height="5.142857142857143px" left="1232px" top="727.9999999999999px" width="665px" />
</layout>
```

METHOD AND APPARATUS FOR PROVIDING ADDITIONAL INFORMATION OF DIGITAL SIGNAGE CONTENT ON A MOBILE TERMINAL USING A SERVER

CROSS-REFERENCE TO RELATED APPLICATION

This application claims the benefit of Korean Patent Application No. 10-2015-0014535, filed on Jan. 29, 2015, in the Korean Intellectual Property Office, the disclosure of which is incorporated herein by reference.

BACKGROUND

1. Field of the Invention

Embodiments relate to a method of providing additional information of content, a mobile terminal and a content control server.

2. Description of the Related Art

Digital signage refers to a digital imaging device service to transfer a variety of information, for example, images or texts, in indoor and outdoor space, to increase an advertising effect. Recently, digital signage is evolving to perform both a function of mass media and a function of personal media using wired and wireless network technologies regardless of places.

An interaction service between a user and a digital signage terminal has been developed to further strengthen an interaction function between the user and the digital signage terminal and to smoothly provide the user with customized information and services suitable for an attribute of the user, for example, an age group or gender.

Also, a function of updating content to be displayed on a display window of the digital signage terminal has been shown. Accordingly, an advertisement targeted at a specific user at a specific place and a specific time slot is possible, and customized services for users are required through interoperation with various smart screen terminals, for example, smartphones. However, it is difficult to provide various customized services.

Accordingly, there is a desire for a technology of providing a user with various customized services.

SUMMARY

An aspect of the present invention is to solve all the above-described problems.

Another aspect of the present invention is to provide a variety of additional information associated with digital signage content so that a plurality of mobile terminal users may simultaneously and immediately verify the variety of additional information.

Still another aspect of the present invention is to provide a further enhanced sense of immersion in content and reality.

Various embodiments of the present disclosure are provided to address the aforementioned problems and to realize the functional effects of the present disclosure, which will be described later, as follows:

According to an aspect, there is provided a method of providing additional information of content, the method being performed by a mobile terminal and including acquiring a captured image of a digital signage terminal that is displaying content and transferring the captured image to a content control server, receiving additional information of the content for each of content areas of the mobile terminal, the content areas being mapped by an information providing server based on screen information of the digital signage terminal, and rendering the received additional information.

The method may further include transmitting a user event to the information providing server upon an occurrence of the user event, and updating the rendered additional information based on the user event or a state of content for each of the content areas.

The acquiring of the captured image may include transmitting, to the content control server, a captured image that recognizes an area of a screen of the digital signage terminal using a camera view.

The rendering of the received additional information may include, when the digital signage terminal disappears from the camera view due to a movement of the mobile terminal in a direction different from a direction of the digital signage terminal, receiving detailed additional information of the rendered additional information, displaying the detailed additional information and rendering the additional information.

The rendering of the received additional information may include receiving detailed additional information of the rendered additional information from the information providing server, displaying the detailed additional information based on the received user event and rendering the additional information.

According to another aspect, there is provided a method of providing additional information of content, the method being performed by a content control server and including receiving a captured image of a digital signage terminal that is displaying content from a mobile terminal, mapping a content area of the digital signage terminal to a content area of the mobile terminal in the captured image based on screen information of the digital signage terminal, and transferring, to the mobile terminal, content connected to additional information of content rendered by the mobile terminal.

The method may further include receiving a user event from the mobile terminal, and transmitting the additional information updated by the mobile terminal based on the user event or a state of content for each of the mapped content areas.

The receiving of the captured image may include receiving a captured image that recognizes an area of a screen of the digital signage terminal using a camera view by the mobile terminal.

The mapping of the content area of the digital signage terminal to the content area of the mobile terminal may include acquiring screen resource information of the digital signage terminal and transmitting the acquired screen resource information to the mobile terminal.

The transferring of the content to the mobile terminal may include transmitting detailed additional information of the rendered additional information to the mobile terminal so that the mobile terminal displays the detailed additional information based on the received user event.

According to another aspect, there is provided a mobile terminal including a captured image transmitter configured to acquire a captured image of a digital signage terminal that is displaying content and to transfer the captured image to a content control server, an additional information receiver configured to receive additional information of the content for each of content areas of the mobile terminal, the content areas being mapped by an information providing server based on screen information of the digital signage terminal, and an additional information renderer configured to render the received additional information.

The mobile terminal may further include an event transmitter configured to transmit a user event to the information providing server upon an occurrence of the user event, and an additional information updater configured to update the rendered additional information based on the user event or a state of content for each of the content areas.

The captured image transmitter may be configured to transmit, to the content control server, a captured image that recognizes an area of a screen of the digital signage terminal using a camera view.

When the digital signage terminal disappears from the camera view due to a movement of the mobile terminal in a direction different from a direction of the digital signage terminal, the additional information renderer may be configured to receive detailed additional information of the rendered additional information, to display the detailed additional information and to render the additional information.

The additional information renderer may be configured to receive detailed additional information of the rendered additional information from the information providing server, to display the detailed additional information and to render the additional information so that the mobile terminal displays the detailed additional information based on the received user event.

According to another aspect, there is provided a content control server including a captured image receiver configured to receive a captured image of a digital signage terminal that is displaying content from a mobile terminal, a content area mapper configured to map a content area of the digital signage terminal to a content area of the mobile terminal in the captured image based on screen information of the digital signage terminal, and a content transmitter configured to transfer, to the mobile terminal, content connected to additional information of content rendered by the mobile terminal.

The content control server may further include an event receiver configured to receive a user event from the mobile terminal, and an additional information transmitter configured to transmit the additional information updated by the mobile terminal based on the user event or a state of content for each of the mapped content areas.

The captured image receiver may be configured to receive a captured image that recognizes an area of a screen of the digital signage terminal using a camera view by the mobile terminal.

The content area mapper may be configured to acquire screen resource information of the digital signage terminal and to transmit the acquired screen resource information to the mobile terminal.

The content transmitter may be configured to transmit detailed additional information of the rendered additional information to the mobile terminal so that the mobile terminal displays the detailed additional information based on the received user event.

Effect

According to embodiments, it is possible to obtain an effect of enabling a plurality of mobile terminal users to simultaneously and immediately verify a variety of additional information associated with digital signage content.

In addition, according to embodiments, it is possible to provide a further enhanced sense of immersion in content and reality.

Furthermore, according to embodiments, it is possible to obtain an effect of acquiring, in real time, content a user desires and detailed information associated with the content.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 1 is a flowchart illustrating a method of providing additional information of content performed by a mobile terminal according to an embodiment;

FIG. 2 illustrates an operation of a system based on a method of providing additional information of content according to an embodiment;

FIG. 3A is a flowchart illustrating a method of providing additional information of content according to an embodiment;

FIG. 3B illustrates screen resource information of a digital signage terminal according to an embodiment;

FIG. 3C illustrates content layout information of a digital signage terminal according to an embodiment;

DETAILED DESCRIPTION

Figure 4A:
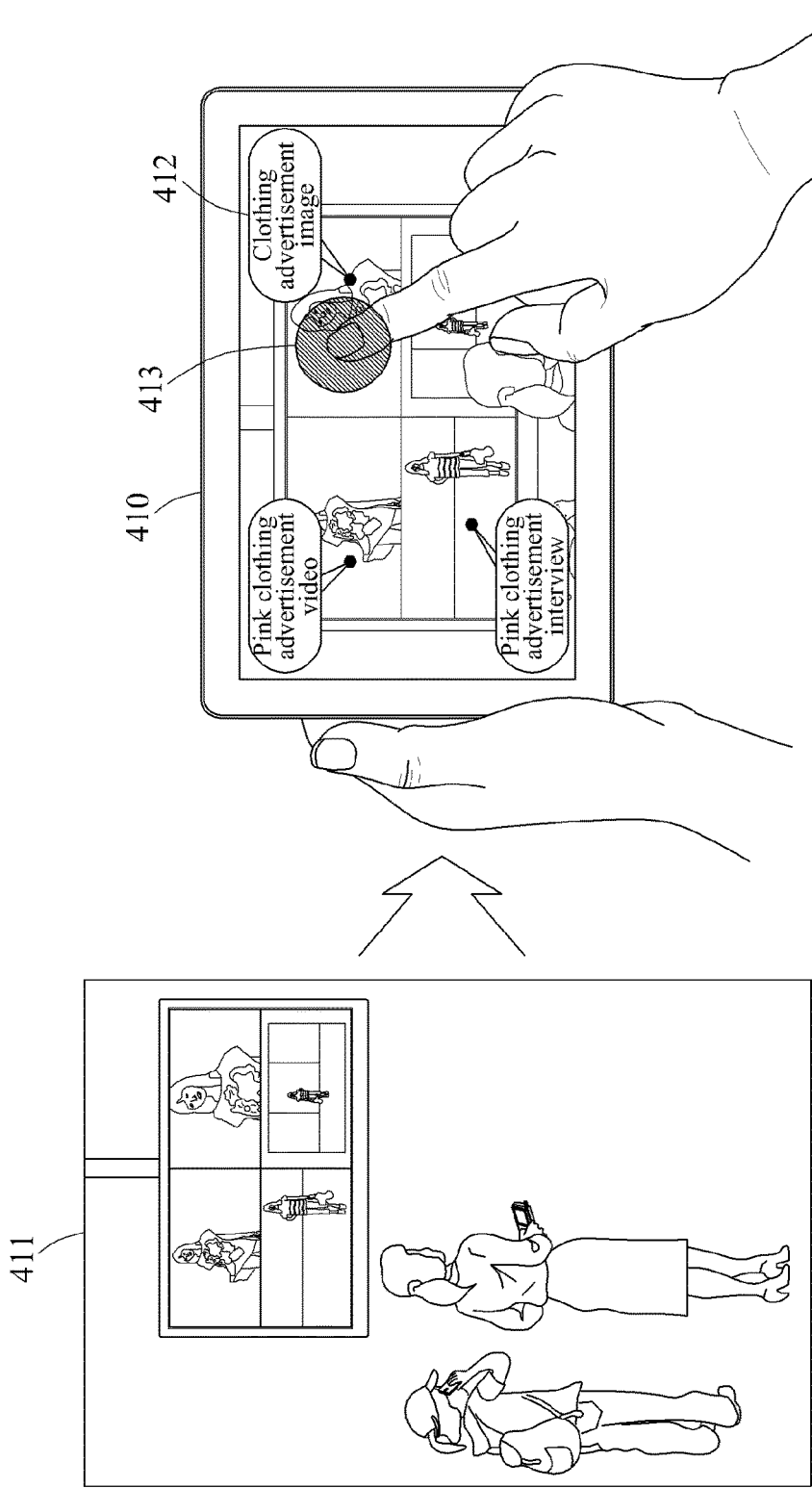
FIG. 4A illustrates an example of displaying additional information of content of a digital signage terminal on a screen of a mobile terminal, as a method of providing additional information of content according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 is a flowchart illustrating a method of providing additional information of content performed by a mobile terminal according to an embodiment.

The method of FIG. 1 may be performed by the mobile terminal through operations described below.

In operation 101, the mobile terminal may acquire a captured image of a digital signage terminal that is displaying content, and may transfer the captured image to a content control server. For example, the mobile terminal may transmit, to the content control server, a captured image that recognizes an area of a screen of the digital signage terminal using a camera view.

In operation 102, the mobile terminal may receive additional information of the content for each of content areas of the mobile terminal mapped by an information providing server based on screen information of the digital signage terminal.

In operation 103, the mobile terminal may render the received additional information.

Here, when the digital signage terminal disappears from a camera view of the mobile terminal due to a movement of the mobile terminal in a direction different from a direction of the digital signage terminal, the mobile terminal may receive detailed additional information of the rendered additional information. Also, the mobile terminal may display the detailed additional information and may render the additional information.

In operation 104, the mobile terminal may transmit a user event to the information providing server upon an occurrence of the user event.

In operation 105, the mobile terminal may update the rendered additional information based on the user event or a state of content for each of the content areas.

Depending on circumstances, after operation 104, the mobile terminal may receive detailed additional information of the rendered additional information from the information providing server and may display the detailed additional information based on the received user event in operation 103.

FIG. 2 illustrates an operation of a system based on a method of providing additional information of content according to an embodiment.

To temporally and spatially arrange and control content 211 displayed on a digital signage terminal 210 using an eXtensible markup language (XML), a mobile terminal 220 may utilize and process attribute information to arrange and control content. The mobile terminal 220 may be a mobile terminal of a user viewing a screen of the digital signage terminal 210. Also, the mobile terminal 220 may display, in real time, content that is being played on the digital signage terminal 210 and information extracted from attribute information so that the content and the extracted information may be superimposed on a screen of the mobile terminal 220. The extracted information may be additional information of the content.

For example, a content server may store screen content that is to be displayed on a digital signage terminal, and information that is extracted from attribute information and that corresponds to additional information associated with the screen content. Also, a content control server may process a user event for the digital signage terminal 210 on the mobile terminal 220, to enable a remote access between the screen of the mobile terminal 220 and the screen of the digital signage terminal 210 and to map content areas between the screens.

The content control server may connect and manage the mobile terminal 220 and a network of the content server, and may control a movement of information. Also, the content control server may control an interaction of the mobile terminal 220 with the digital signage terminal 210.

Referring to FIG. 2, the mobile terminal 220 may display additional information of content so that the screen of the digital signage terminal 210 may be verified through the mobile terminal 220. For example, additional information of the content 211 on the screen of the digital signage terminal 210 may be displayed.

In addition, the mobile terminal 220 may remotely access and control the screen of the digital signage terminal 210. Also, the mobile terminal 220 may render additional information and may receive a user event. Furthermore, the mobile terminal 220 may display additional information 221 of the content 211 that is being played on the screen of the digital signage terminal 210.

For example, when the content 211 displayed on the digital signage terminal 210 is associated with clothing, a clothing-related menu or text, for example, clothing advertisement video, a clothing advertisement image and a clothing advertisement interview, may be added as the additional information 221, and may be displayed on the mobile terminal 220. In this example, content displayed on the digital signage terminal 210 may be different from content displayed on the mobile terminal 220.

The mobile terminal 220 may display the additional information 221 while updating the additional information 221 in real time depending on states of the content 211 displayed on the screen of the digital signage terminal 210. Also, the mobile terminal 220 may remotely activate a camera view for the screen of the digital signage terminal 210. The content control server may calculate mapping of the content areas between the screens, and may connect the screens.

FIG. 3A is a flowchart illustrating a method of providing additional information of content according to an embodiment.

A flow to display additional information of content that is being played on a digital signage terminal in real time, on a screen of a mobile terminal through a remote camera view of the mobile terminal is described with reference to FIG. 3A.

When a user input event to select at least one piece of additional information from additional information displayed in real time on the screen of the mobile terminal occurs, the mobile terminal may display detailed additional information connected to the selected additional information on the screen of the mobile terminal.

According to an embodiment, a content control server may map areas between the screen of the mobile terminal and a screen of the digital signage terminal using the remote camera view of the mobile terminal, to connect the two screens. When the remote camera view is not directed towards the digital signage terminal, the content control server may connect or disconnect the two screens by a user event.

In operation 301, when an input event, for example, a touch of a user of the mobile terminal, occurs, a web app installed in the mobile terminal may be activated, and the mobile terminal may recognize an area of the digital signage terminal using the remote camera view. Here, the content control server may attempt to access the mobile terminal and the digital signage terminal.

In operation 302, the mobile terminal may receive screen resource information of the digital signage terminal from the content control server through a remote access. For example, the mobile terminal may receive at least one of a full screen size (for example, a resolution) of the digital signage terminal, a type (for example, a display type) of the digital signage terminal, and a layout of content on the screen of the digital signage terminal.

In operation 303, the content server may store content of the screen of the digital signage terminal and additional information associated with the content. The content control server may map content areas between the screen of the digital signage terminal and the screen of the mobile terminal based on a size and a location of each of the screens.

In operation 304, the content control server may transmit mapping information to the mobile terminal, if necessary.

The mobile terminal may receive the mapping information from the content control server.

In operation 305, when the content of the screen of the digital signage terminal and content of the mobile terminal are mapped in real time, the content control server may acquire the additional information stored in the content server, and may transmit the additional information to the mobile terminal. Also, the mobile terminal may maintain a rendering state of the additional information to float so that the additional information may be superimposed for each content on the screen of the mobile terminal.

When the additional information for each content is rendered, and when a user event, for example, a touch event of the user of the mobile terminal, does not occur in operation 306, the mobile terminal may directly activate an input function to display detailed additional information connected to the additional information in operation 307. Here, the detailed additional information may include, but not limited to, for example, images, moving images or documents different from the additional information.

When the additional information for each content is rendered, and when the user of the mobile terminal allows the mobile terminal to face a different direction from a direction of the digital signage terminal, a reality image different from that of the digital signage terminal may be input from a camera view of the mobile terminal in operation 308. Here, the mobile terminal may allow the additional information for each content to continue to float on the screen of the mobile terminal. When the user of the mobile terminal moves to a place apart from the digital signage terminal, the mobile terminal may display detailed additional information connected to the additional information in the screen of the digital signage terminal so that the user may verify the detailed additional information.

When the additional information for each content is rendered, and when a web app is deactivated or another event associated with a screen user interface (UI) is input by the user of the mobile terminal, or when an event in which the mobile terminal is directed towards another neighboring digital signage terminal occurs in operation 306, the content control server may perform a process. Here, depending on circumstances, the content control server may re-perform a remote access between the screen of the mobile terminal and the screen of the digital signage terminal in operation 301. When the event in which the mobile terminal is directed towards the neighboring digital signage terminal occurs, the content control server may re-perform the remote access between the screen of the mobile terminal and a screen of the neighboring digital signage terminal in operation 301.

FIG. 3B illustrates screen resource information of a digital signage terminal according to an embodiment.

FIG. 3B illustrates a full screen size of the digital signage terminal, a type of the digital signage terminal, and a device identification (ID) or an Internet protocol (IP) assigned to the digital signage terminal. A screen size may be, for example, 1080×1920, or 1920×480. The type of the digital signage terminal may be, for example, Kiosk, Bar, Shelf, or Big.

A mobile terminal may receive screen resource information of the digital signage terminal. For example, the mobile terminal may receive at least one of a full screen size (for example, a resolution) of the digital signage terminal, a type (for example, a display type) of the digital signage terminal, and a layout of content on a screen of the digital signage terminal.

FIG. 3C illustrates content layout information of a digital signage terminal according to an embodiment.

FIG. 3C illustrates information about a layout of content on a screen of the digital signage terminal.

According to an embodiment, a content server may store content of the screen of the digital signage terminal and additional information associated with the content. A content control server may map content areas between the screen of the digital signage terminal and a screen of the mobile terminal based on a size and a location of each of the screens. Also, the content control server may transmit mapping information to the mobile terminal, if necessary. The mobile terminal may receive the mapping information from the content control server.

When the content of the screen of the digital signage terminal and content of the mobile terminal are mapped in real time, the content control server may acquire the additional information stored in the content server, and may transmit the additional information to the mobile terminal. Also, the mobile terminal may maintain a rendering state of the additional information to float so that the additional information may be superimposed for each content on the screen of the mobile terminal.

In an example, when the additional information for each content is rendered, and when a user event, for example, a touch event of a user of the mobile terminal, does not occur, the mobile terminal may directly activate an input function to display detailed additional information connected to the additional information. In this example, the detailed additional information may include, but not limited to, for example, images, moving images or documents different from the additional information.

In another example, when the additional information for each content is rendered, and when the user of the mobile terminal allows the mobile terminal to face a different direction from a direction of the digital signage terminal, a reality image different from that of the digital signage terminal may be input from a camera view of the mobile terminal. In this example, the mobile terminal may allow the additional information for each content to continue to float on the screen of the mobile terminal. When the user of the mobile terminal moves to a place apart from the digital signage terminal, the mobile terminal may display detailed additional information connected to the additional information in the screen of the digital signage terminal so that the user may verify the detailed additional information.

In still another example, when the additional information for each content is rendered, and when a web app is deactivated or another event associated with a screen UI is input by a user of the mobile terminal or when an event in which the mobile terminal is directed towards another neighboring digital signage terminal occurs, the content control server may perform a process. In this example, depending on circumstances, the content control server may re-perform a remote access between the screen of the mobile terminal and the screen of the digital signage terminal. When the event in which the mobile terminal is directed towards the neighboring digital signage terminal occurs, the content control server may re-perform a remote access between the screen of the mobile terminal and a screen of the neighboring digital signage terminal.

FIG. 4A illustrates an example of displaying additional information of content of a digital signage terminal on a screen of a mobile terminal, as a method of providing additional information of content according to an embodiment.

Referring to FIG. 4A, a mobile terminal 410 may acquire content that is being played on a digital signage terminal and an image of a situation 411 of the digital signage terminal, and may transmit the content and the image to a content control server.

The content control server may be connected to a content server, may acquire the content that is being played on the digital signage terminal, may transmit the content to the mobile terminal 410. The mobile terminal 410 may receive the content from the content control server. For example, information of the content server may be transmitted to the mobile terminal 410, and the mobile terminal 410 may receive content from the content server, however, there is no limitation thereto.

The mobile terminal 410 may display additional information, for example, additional information 412, of the content being played on a screen of the digital signage terminal in real time on a screen of the mobile terminal 410. Also, the mobile terminal 410 may activate an input function 413 to display detailed additional information connected to the additional information 412, and may generate a user input event.

Figure 4B:
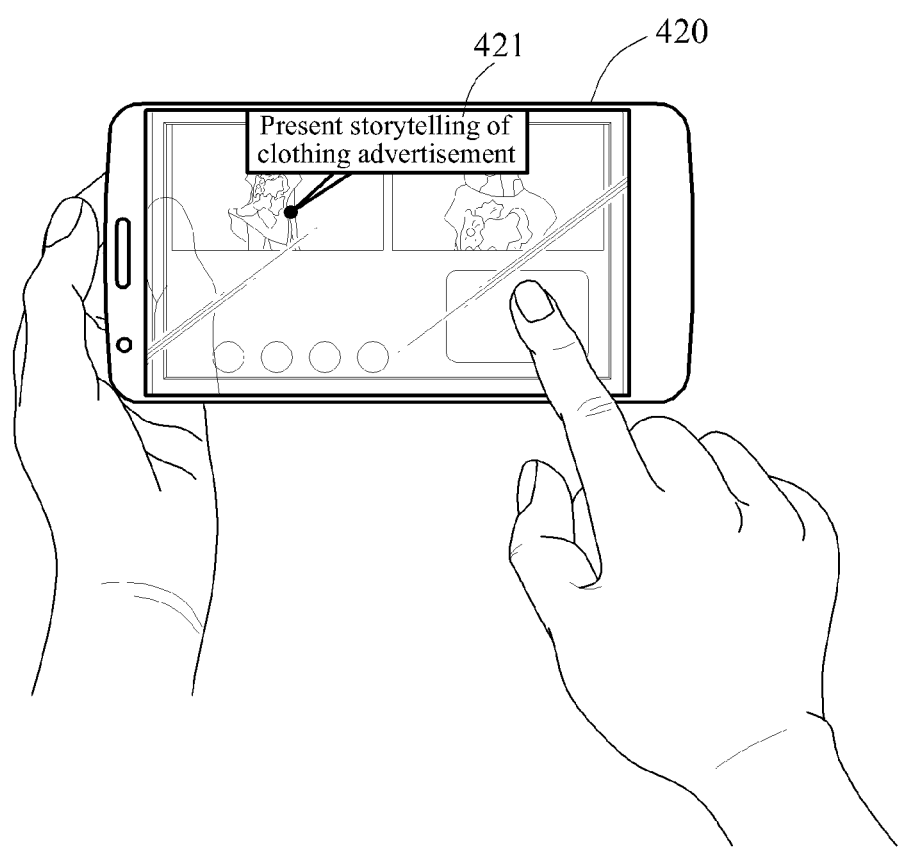
FIG. 4B illustrates an example of displaying detailed additional information connected to additional information of content of a digital signage terminal on a screen of a mobile terminal, as a method of providing additional information of content according to an embodiment.

FIG. 4B illustrates an example of displaying detailed additional information connected to additional information of content of a digital signage terminal on a screen of a mobile terminal, as a method of providing additional information of content according to an embodiment.

Referring to FIG. 4B, a mobile terminal 420 may display detailed additional information 421 connected to additional information on a screen of the mobile terminal 420.

For example, when a user touches additional information of content associated with a clothing advertisement image, a user event may occur, and the mobile terminal 420 may transmit information of the user event to a content control server. The content control server may receive the information of the user event, and may transmit the detailed additional information 421 to the mobile terminal 420 based on the information. In this example, the mobile terminal 420 may display the detailed additional information 421 on the screen of the mobile terminal 420. Depending on circumstances, the mobile terminal 420 may also display a menu related to the detailed additional information 421.

Figure 5:
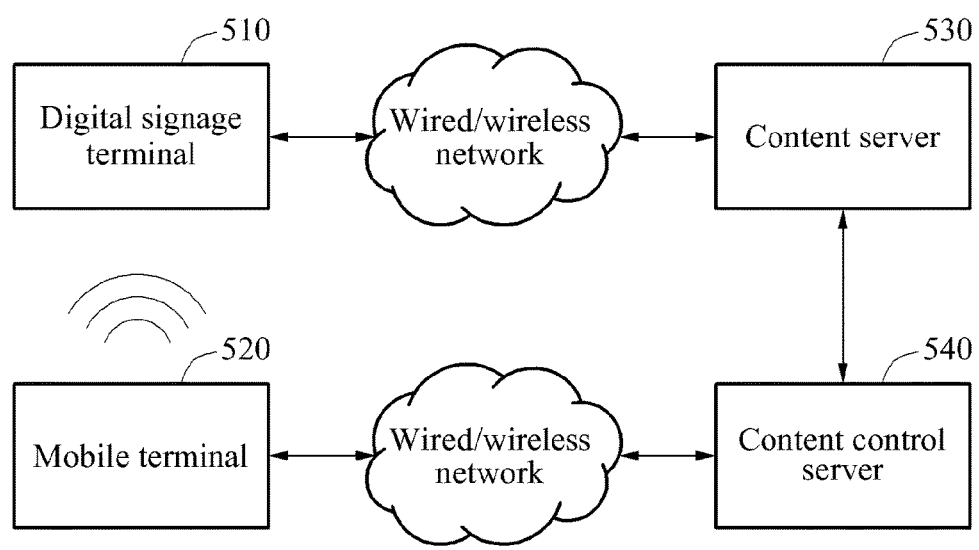
FIG. 5 illustrates an entire system to describe a method of providing additional information of content according to an embodiment.

FIG. 5 illustrates an entire system to describe a method of providing additional information of content according to an embodiment.

FIG. 5 illustrates a system configuration environment for the method of providing additional information of content.

The entire system for the method of providing additional information of content may include, as main components, a digital signage terminal 510 and a mobile terminal 520 corresponding to the digital signage terminal 510, based on a wired/wireless network environment. Also, the entire system may include a content server 530 and a content control server 540.

The content server 530 may store content of a screen of the digital signage terminal 510, additional information associated with each content, and detailed additional information. Also, the content server 530 may provide content played on the screen of the digital signage terminal 510.

The content control server 540 may control or transfer, to the mobile terminal 520, the content, the additional information and the detailed additional information stored in the content server 530.

Figure 6:
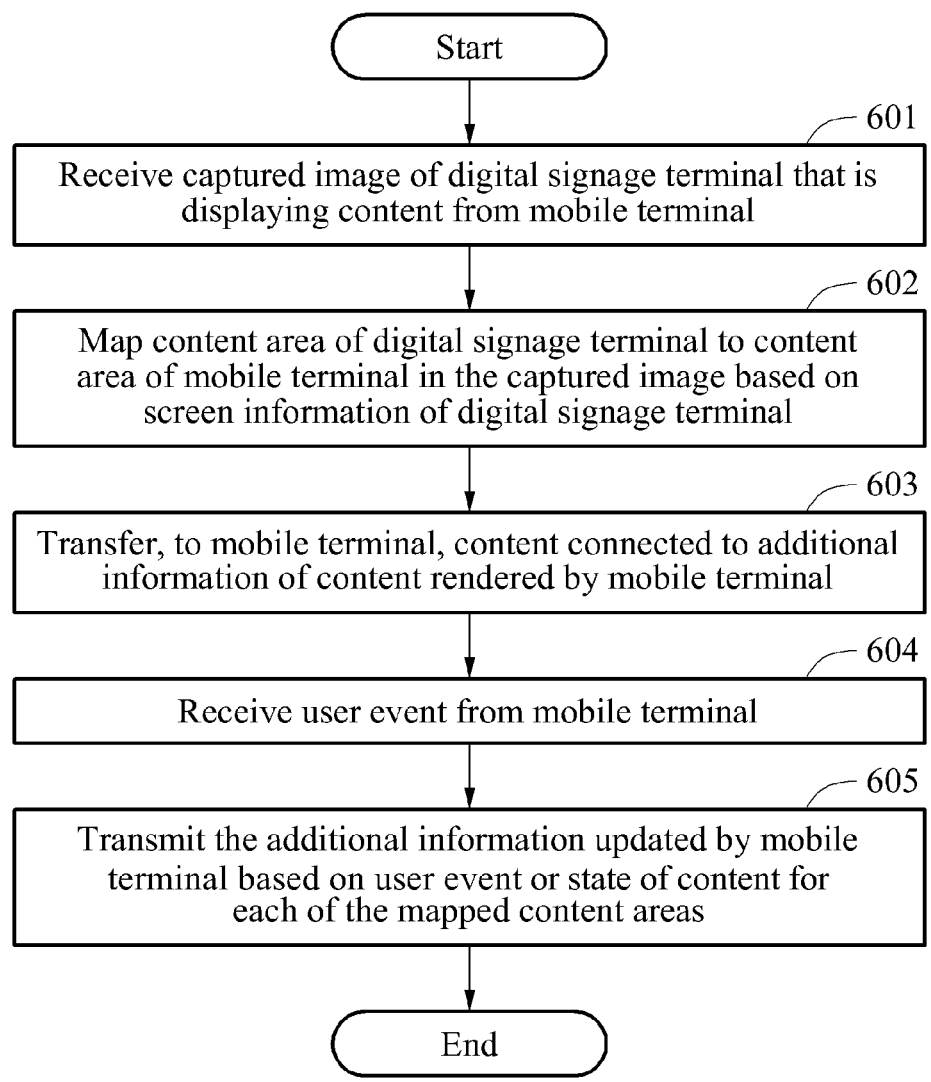
FIG. 6 is a flowchart illustrating a method of providing additional information of content performed by a content control server according to an embodiment.

FIG. 6 is a flowchart illustrating a method of providing additional information of content performed by a content control server according to an embodiment.

The method of FIG. 6 may be performed by the content control server through operations described below.

In operation 601, the content control server may receive, from a mobile terminal, a captured image of a digital signage terminal on which content is being displayed.

For example, the content control server may receive a captured image that recognizes an area of a screen of the digital signage terminal using a camera view of the mobile terminal.

In operation 602, the content control server may map a content area of the digital signage terminal to a content area of the mobile terminal in the captured image, based on screen information of the digital signage terminal.

The content control server may acquire screen resource information of the digital signage terminal and may transmit the acquired screen resource information to the mobile terminal.

In operation 603, the content control server may transfer, to the mobile terminal, content connected to additional information of content rendered by the mobile terminal.

In operation 604, the content control server may receive a user event from the mobile terminal.

Depending on circumstances, when the user event is received in operation 604, the content control server may transmit detailed additional information of the rendered additional information to the mobile terminal so that the mobile terminal may display the detailed additional information, based on the received user event in operation 603.

In operation 605, the content control server may transmit the additional information updated by the mobile terminal, based on the user event or a state of content for each of the mapped content areas.

Figure 7:
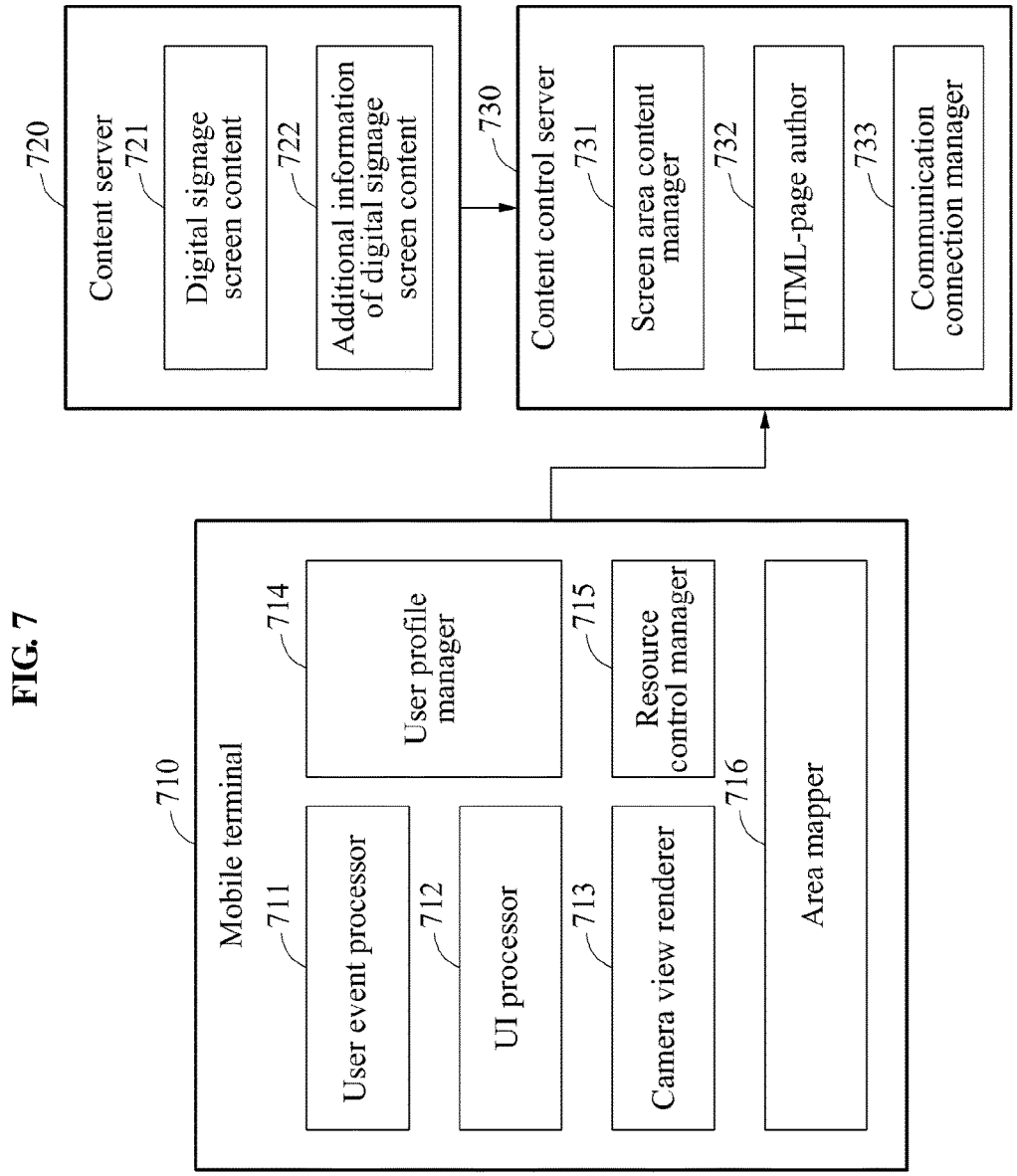
FIG. 7 illustrates a mobile terminal, a content server and a content control server according to an embodiment.

FIG. 7 illustrates a mobile terminal 710, a content server 720 and a content control server 730 according to an embodiment.

FIG. 7 illustrates an event and an interaction processing process between the mobile terminal 710, the content server 720 and the content control server 730. Also, FIG. 7 illustrates a configuration of each of the mobile terminal 710, the content server 720 and the content control server 730. The mobile terminal 710 may interact with a digital signage terminal. A user event processor 711 of the mobile terminal 710 may process an event input by a user of the mobile terminal 710. For example, when the user of the mobile terminal 710 allows the mobile terminal 710 to face a different direction from a direction of digital signage terminal, that is, when a user event occurs in a state in which additional information of each content of the digital signage terminal is rendered on a screen of the mobile terminal 710, the user event processor 711 may process the user event.

A camera view renderer 713 of the mobile terminal 710 may receive content that is being played on the digital signage terminal and an image of a situation using a remote camera view of the mobile terminal 710. Also, the camera view renderer 713 may display, in real time on the screen of the mobile terminal 710, additional information of the content that is being played on a screen of the digital signage terminal, and may process a display of detailed additional information connected to the additional information.

A UI processor 712 of the mobile terminal 710 may process a basic UI-related function on the screen of the mobile terminal 710.

A resource control manager 715 of the mobile terminal 710 may process screen resource information of a digital signage screen, the screen of the digital signage terminal. The screen resource information may be received from the content control server 730 through a remote access between the mobile terminal 710 and the digital signage terminal.

An area mapper 716 of the mobile terminal 710 may map content areas between the screen of the mobile terminal 710 and the screen of the digital signage terminal through relative processing of a size and a location between the screens.

The content server 720 may store digital signage screen content 721 and additional information 722 of digital signage screen content.

A communication connection manager 733 of the content control server 730 may connect the content control server 730 to the mobile terminal 710 and may transfer attribute information of the digital signage screen content 721 and the additional information 722 stored in the content server 720 to the mobile terminal 710.

A screen area content manager 731 of the content control server 730 may manage layout information corresponding to a layout of content on the digital signage screen, screen of the digital signage terminal. For example, the screen area content manager 731 may generate a web address uniform resource locator (URL) as a storage location of the digital signage screen content 721 stored in the content server 720, may allow the generated web address URL to correspond to the layout information, and may match the layout information for each screen area.

A hypertext markup language (HTML)-page author 732 of the content control server 730 may embed the digital signage screen content 721 matched for each area in correspondence to the layout information in a web page, and may allow the digital signage screen content 721 to be displayed on the mobile terminal 710.

The content control server 730 may temporally and spatially arrange and control content to be displayed on the digital signage terminal using an XML, and may utilize and process attribute information associated with the content. Also, the mobile terminal 710 may allow the content that is played on the digital signage terminal and additional information of the content to be superimposed and to be displayed in real time on the screen of the mobile terminal 710 of a user viewing the screen of the digital signage terminal. The additional information may be information extracted from the attribute information, however, is not limited thereto.

The content server 720 may store screen content to be displayed on the digital signage terminal, and additional information associated with content. The additional information may be information extracted from attribute information. When an input of a user event for the digital signage terminal is received from the mobile terminal 710, the content control server 730 may process the user event, to perform a remote access between screens.

Also, the content control server 730 may map areas between the screens. During the mapping, the content control server 730 may control an information transfer and a network connection management of the mobile terminal 710 and the content server 720. In addition, the content control server 730 may control an interaction of the mobile terminal 710 with the digital signage terminal.

As described above, the mobile terminal 710 may include the user event processor 711, the UI processor 712, the camera view renderer 713, a user profile manager 714, the resource control manager 715, and the area mapper 716. The mobile terminal 710 may be a computing device, for example, a smartphone or a tablet. The mobile terminal 710 may include a camera, a transparent display or a flexible display, or include a smart screen with a smart function, however, there is no limitation thereto. The user event processor 711, the UI processor 712, the camera view renderer 713, the user profile manager 714, the resource control manager 715, and the area mapper 716 may include at least one of a processor, a memory and a data transceiver. Also, the user event processor 711, the UI processor 712, the camera view renderer 713, the user profile manager 714, the resource control manager 715, and the area mapper 716 may include a sensor, an electronic circuit, an electric circuit, and an integrated circuit, however, there is no limitation thereto.

Figure 8:
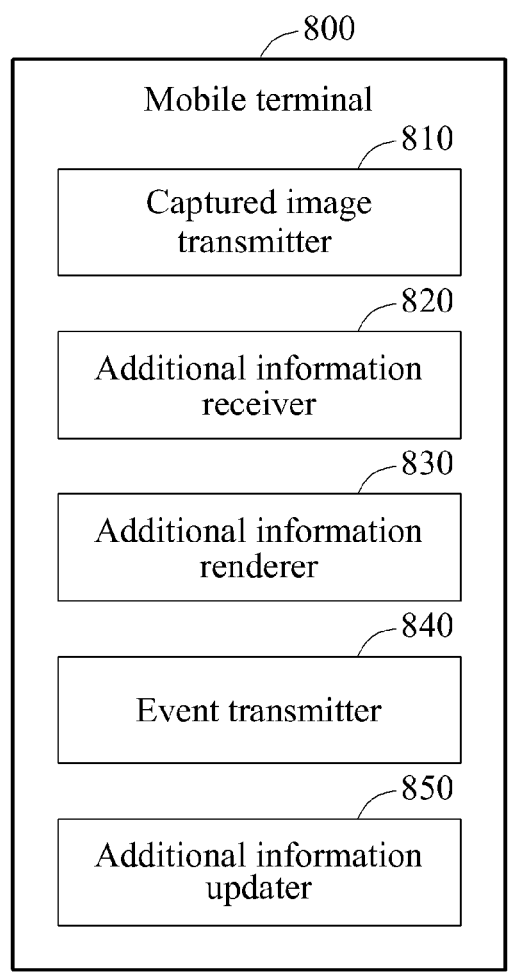
FIG. 8 is a block diagram illustrating a mobile terminal according to an embodiment.

FIG. 8 is a block diagram illustrating a mobile terminal 800 according to an embodiment.

Referring to FIG. 8, the mobile terminal 800 may include a captured image transmitter 810, an additional information receiver 820, an additional information renderer 830, an event transmitter 840, and an additional information updater 850. The mobile terminal 800 may be a computing device, for example, a smartphone or a tablet. The mobile terminal 800 may include a camera, a touch panel, a transparent display or a flexible display, or include a smart screen with a smart function, however, there is no limitation thereto. The captured image transmitter 810, the additional information receiver 820, the additional information renderer 830, the event transmitter 840 and the additional information updater 850 may include at least one of a processor, a memory and a data transceiver. Also, the captured image transmitter 810, the additional information receiver 820, the additional information renderer 830, the event transmitter 840 and the additional information updater 850 may include a sensor, an electronic circuit, an electric circuit, and an integrated circuit, however, there is no limitation thereto.

The captured image transmitter 810 may acquire a captured image of a digital signage terminal that is displaying content, and may transfer the captured image to a content control server. For example, the captured image transmitter 810 may transmit, to the content control server, a captured image that recognizes an area of a screen of the digital signage terminal using a camera view.

The additional information receiver 820 may receive additional information of the content for each of content areas of the mobile terminal mapped by an information providing server based on screen information of the digital signage terminal.

The additional information renderer 830 may render the received additional information. For example, when the digital signage terminal disappears from the camera view of the mobile terminal 800 due to a movement of the mobile terminal 800 in a direction different from a direction of the digital signage terminal, the additional information renderer 830 may receive detailed additional information of the rendered additional information, and may display the detailed additional information.

Also, the additional information renderer 830 may receive detailed additional information of the rendered additional information from the information providing server so that the mobile terminal 800 may display the detailed additional information based on the received user event.

The event transmitter 840 may transmit a user event to the information providing server upon an occurrence of the user event.

The additional information updater 850 may update the rendered additional information based on the user event or a state of content for each of the content areas.

Figure 9:
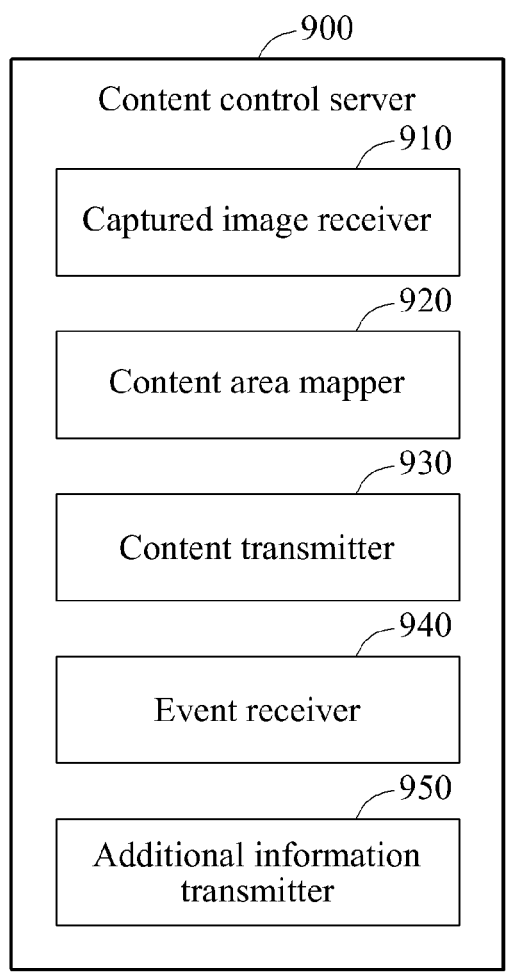
FIG. 9 is a block diagram illustrating a content control server according to an embodiment.

FIG. 9 is a block diagram illustrating a content control server 900 according to an embodiment.

Referring to FIG. 9, the content control server 900 may include a captured image receiver 910, a content area mapper 920, a content transmitter 930, an event receiver 940, and an additional information transmitter 950. The captured image receiver 910, the content area mapper 920, the content transmitter 930, the event receiver 940 and the additional information transmitter 950 may include at least one of a processor, a memory and a data transceiver, however, there is no limitation thereto.

The captured image receiver 910 may receive, from a mobile terminal, a captured image of a digital signage terminal on which content is being displayed. For example, the captured image receiver 910 may receive a captured image that recognizes an area of a screen of the digital signage terminal using a camera view of the mobile terminal.

The content area mapper 920 may map a content area of the digital signage terminal to a content area of the mobile terminal in the captured image, based on screen information of the digital signage terminal. Also, the content area mapper 920 may acquire screen resource information of the digital signage terminal and may transmit the acquired screen resource information to the mobile terminal.

The content transmitter 930 may transfer, to the mobile terminal, content connected to additional information of content rendered by the mobile terminal. Depending on circumstances, the content transmitter 930 may transmit detailed additional information of the rendered additional information to the mobile terminal so that the mobile terminal may display the detailed additional information based on a user event.

The event receiver 940 may receive a user event from the mobile terminal.

The additional information transmitter 950 may transmit the additional information updated by the mobile terminal, based on the user event or a state of content for each of the mapped content areas.

As described above, the method of providing additional information of content may perform a remote information processing process using content that is being displayed as a minimum unit, instead of processing of a unit of an image frame and attribute information of content that is being displayed on an existing digital signage terminal. Also, the method of providing additional information of content may allow a plurality of mobile terminal users to simultaneously, remotely and immediately verify a variety of additional information associated with visible digital signage content. In addition, the method of providing additional information of content may allow a user to easily experience a better sense of immersion in content and reality using a mobile terminal of the user. Further, the method of providing additional information of content may allow a user to directly acquire desired content and detailed information associated with the desired content using a smart screen terminal of the user in real time, based on resource information included in content of a digital signage terminal, in terms of sharing of content information between the digital signage terminal and the mobile terminal.

Also, the method of providing additional information of content may have an effect of providing a user with bidirectional additional information of digital signage content using a digital signage terminal and a mobile terminal.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of providing additional information, performed by a mobile terminal, the method comprising:
   acquiring a captured image of a digital signage terminal that is displaying content of the digital signage terminal on a display of the digital signage terminal, wherein the content of the digital signage terminal is divided into demarcated content areas of the digital signage terminal;
   transferring the captured image to a content control server;
   receiving the additional information which is about each of demarcated content areas of the mobile terminal into which content of the mobile terminal is divided, wherein the demarcated content areas of the digital signage terminal are mapped to the demarcated content areas of the mobile terminal by an information providing server based on screen information of the digital signage terminal;
   displaying the content of the digital signage terminal on a display of the mobile terminal; and
   rendering the additional information on the display of the mobile terminal such that the additional information is respectively superimposed over the demarcated content areas of the mobile terminal, wherein a layout of the demarcated content areas of the digital signage terminal corresponds in appearance to a layout of the demarcated content areas of the mobile terminal.

2. The method of claim 1, wherein the displayed content of the mobile terminal is synchronized with the displayed content of the digital signage terminal.

3. The method of claim 1, wherein the additional information comprises an advertisement.

4. The method of claim 1, wherein the demarcated content of the digital signage terminal corresponds in appearance to the demarcated content of the mobile terminal.

5. The method of claim 1, wherein the captured image is displayed along with existing content of the mobile terminal.

6. The method of claim 1, further comprising
   transmitting a user event to the information providing server upon an occurrence of the user event, and
   updating the additional information based on the user event or a state of content for each of the demarcated content areas of the digital signage terminal.

7. The method of claim 6, wherein the rendering of the additional information comprises receiving detailed additional information of the additional information from the information providing server, and displaying the detailed additional information based on the received user event.

8. The method of claim 7, wherein
   the detailed additional information comprises a speech bubble containing text, and
   the speech bubble points to a location on one of the content areas.

9. The method of claim 1, wherein the acquiring of the captured image comprises transmitting, to the content control server, the captured image, and recognizing an area of the display of the digital signage terminal using a camera view.

10. The method of claim 9, wherein
    the rendering of the additional information comprises, in response to the digital signage terminal disappearing from the camera view due to a movement of the mobile terminal in a direction different from a direction of the digital signage terminal, receiving detailed additional information of the additional information, and displaying the detailed additional information, and
    the detailed additional information comprises any one or any combination of any two or more of images, moving images, and documents.

11. A method of providing additional information, performed by a content control server, the method comprising:
    receiving, from a mobile terminal, a captured image of a digital signage terminal that is displaying content of the digital signage terminal on a display of the digital signage terminal, wherein the content of the digital signage terminal is divided into demarcated content areas of the digital signage terminal;
    respectively mapping the demarcated content areas of the digital signage terminal to corresponding demarcated content areas of the mobile terminal into which content of the mobile terminal is divided based on screen information of the digital signage terminal; and
    transferring, from the content control server, to the mobile terminal, the additional information which is about each of the demarcated content areas of the mobile terminal to enable the mobile terminal to display the content of the digital signage terminal on a display of the mobile terminal, and render the additional information on the display of the mobile terminal such that the additional information is respectively superimposed over the demarcated content areas of the mobile terminal, wherein a layout of the demarcated content areas of the digital signage terminal corresponds in appearance to a layout of the demarcated content areas of the mobile terminal.

12. The method of claim 11, further comprising
    receiving a user event from the mobile terminal, and
    transmitting the additional information which is updated by the mobile terminal based on the user event or a state of content for each of the mapped demarcated content areas of the digital signage terminal.

13. The method of claim 12, wherein the receiving of the user event comprises receiving the captured image, and recognizing an area of the display of the digital signage terminal using a camera view of the mobile terminal.

14. The method of claim 11, wherein the mapping comprises acquiring screen resource information of the digital signage terminal, and transmitting the acquired screen resource information to the mobile terminal.

15. The method of claim 12, wherein the transferring comprises transmitting detailed additional information of the additional information which is rendered to the mobile terminal to enable the mobile terminal to display the detailed additional information based on the received user event, and wherein the detailed additional information comprises any one or any combination of any two or more of images, moving images, and documents.

16. A mobile terminal, comprising:
    a camera configured to capture an image of a digital signage terminal that is displaying content of the digital signageterminal, which is divided into content areas of the digital signage terminal, on a display of the digital signage terminal;
    a transmitter configured to transfer the captured image to a content control server;
    a processor configured to receive additional information about content areas of the mobile terminal, wherein the content of the digital signage terminal is divided in a one-to-one correspondence with the content areas of the mobile terminal, wherein the content areas of the digital signage terminal are mapped to the content areas of the mobile terminal by an information providing server based on screen resource information of the digital signage terminal, wherein the screen resource information comprises a full screen size, a display type, and a layout of the content of the digital signage terminal on the screen of the digital signage terminal; and a display configured to render the additional information such that the additional information is respectively superimposed over the content areas of the mobile terminal, wherein a layout of the content areas of the digital signage terminal corresponds in appearance to a layout of the content areas of the mobile terminal.

17. The mobile terminal of claim 16, wherein the transmitter is further configured to transmit a user event to the information providing server upon an occurrence of the user event, and the processor is further configured update the additional information based on the user event or a state of content for each of the content areas of the digital signage terminal.

18. The mobile terminal of claim 17, wherein the processor is further configured to receive detailed additional information of the additional information from the information providing server, the display is further configured to display the detailed additional information based on the received user event, and the detailed additional information comprises any one or any combination of any two or more of images, moving images, and documents.

19. The mobile terminal of claim 16, wherein the transmitter is further configured to transmit the captured image to the content control server, and the processor is further configured to recognize an area of the display of the digital signage terminal using a camera view.

20. The mobile terminal of claim 19, wherein the processor is further configured to, in response to the digital signage terminal disappearing from the camera view due to a movement of the mobile terminal in a direction different from a direction of the digital signage terminal, receive detailed additional information of the additional information, the display is further configured to display the detailed additional information, and the detailed additional information comprises any one or any combination of any two or more of images, moving images, and documents.

* * * * *